(12) United States Patent
Ohta et al.

(10) Patent No.: US 8,215,706 B2
(45) Date of Patent: Jul. 10, 2012

(54) VEHICLE BODY SIDE STRUCTURE

(75) Inventors: Yoshikatsu Ohta, Wako (JP); Yuta Urushiyama, Wako (JP); Hirokazu Kobayashi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 195 days.

(21) Appl. No.: 12/788,761

(22) Filed: May 27, 2010

(65) Prior Publication Data
US 2010/0301630 A1 Dec. 2, 2010

(30) Foreign Application Priority Data
May 27, 2009 (JP) ................................. 2009-127659

(51) Int. Cl.
*B60J 5/04* (2006.01)
(52) U.S. Cl. ................................. 296/187.12; 296/146.6
(58) Field of Classification Search ............. 296/187.09, 296/187.12, 146.6
See application file for complete search history.

(56) References Cited

U.S. PATENT DOCUMENTS

| | | | |
|---|---|---|---|
| 5,599,057 A * | 2/1997 | Hirahara et al. | ............ 296/146.6 |
| 5,800,007 A * | 9/1998 | Cho | ............ 296/146.6 |
| 6,450,565 B2 * | 9/2002 | Yamamoto | ............ 296/187.09 |
| 7,036,874 B2 | 5/2006 | Stojkovic et al. | |
| 7,472,942 B2 | 1/2009 | Yamasaki | |

FOREIGN PATENT DOCUMENTS

| | | |
|---|---|---|
| CN | 1824564 A | 8/2006 |
| CN | 1880145 A | 12/2006 |
| CN | 201165833 Y | 12/2008 |
| JP | 48051425 | 7/1973 |
| JP | 63-152719 | 10/1988 |
| JP | 06-234325 | 8/1994 |
| JP | 09-290639 | 11/1997 |
| JP | 2001-206244 | 7/2001 |
| JP | 2001-315664 | 11/2001 |
| JP | 2002-347441 | 12/2002 |

* cited by examiner

*Primary Examiner* — Joseph Pape
(74) *Attorney, Agent, or Firm* — Rankin, Hill & Clark LLP

(57) ABSTRACT

A vehicle body side structure in which a load acting from the front of the vehicle body is efficiently transferred to a door beam, whereby the weight of a side sill is reduced. A vehicle body side structure includes a front door provided to a front vehicle body opening via a front hinge, a front door beam provided to the front door and coupled at the front end to the front hinge, and an interaction for transferring a load to a rear part of the vehicle body, the interaction being provided to the side of the front hinge facing the front of the vehicle body. The front hinge includes a front attachment part provided to the vehicle body, and a front coupling part rotatably supported on the front attachment part and coupled with the front door beam. The front attachment part has a front bearing for bearing a load acting from the interaction.

12 Claims, 14 Drawing Sheets

FIG.12
(a)
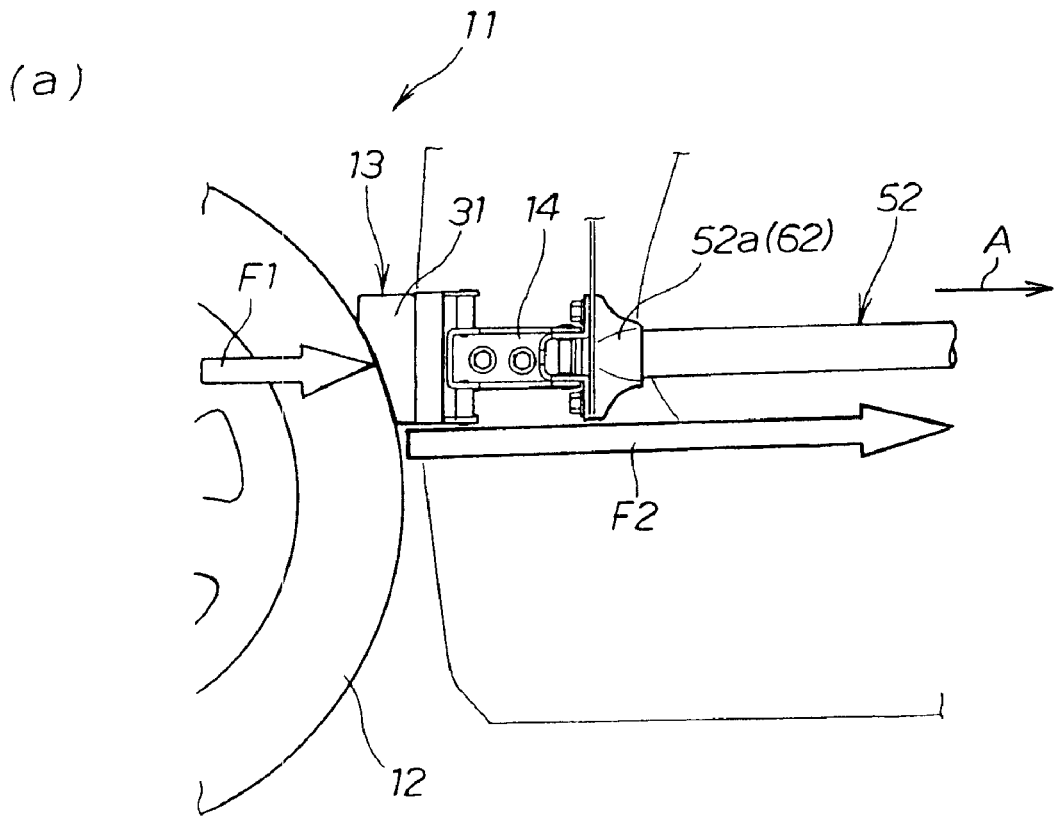
(b)
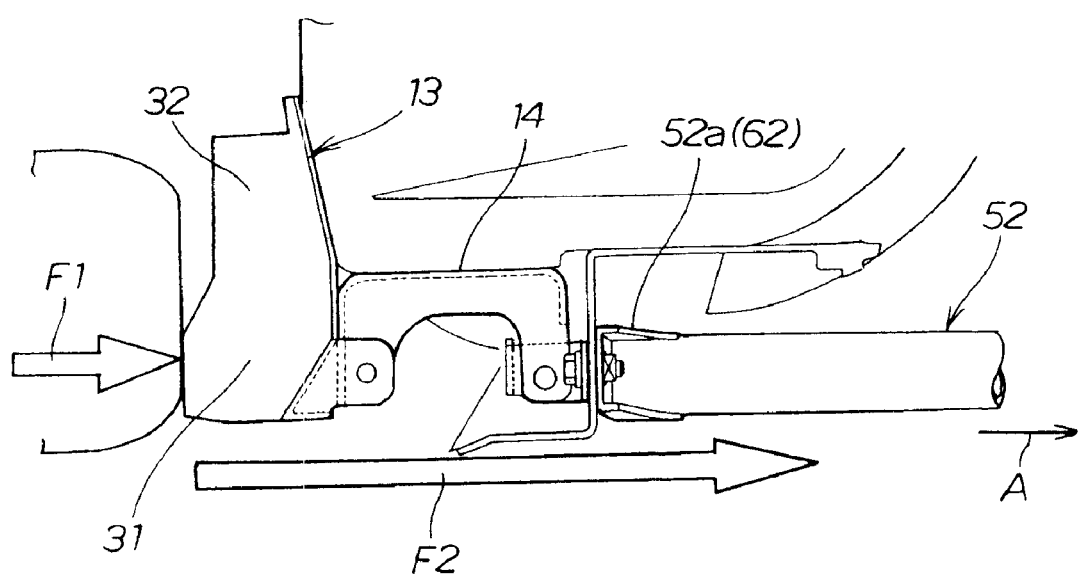

FIG.13
(a)
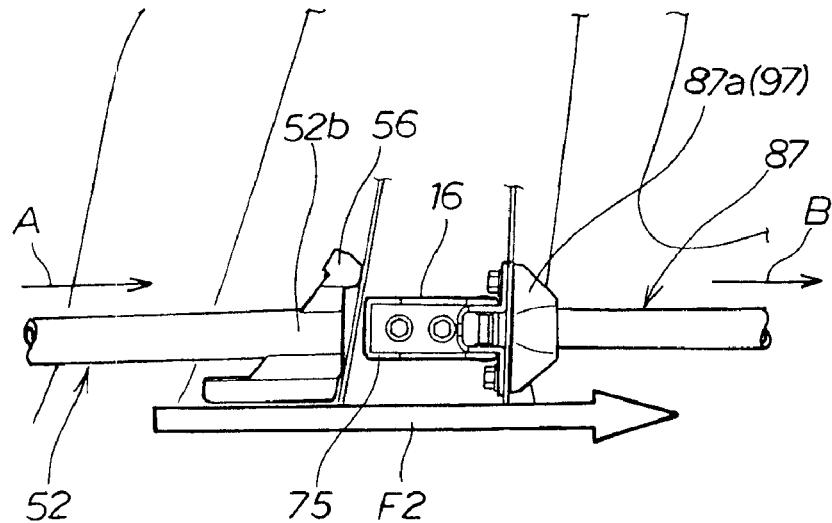
(b)
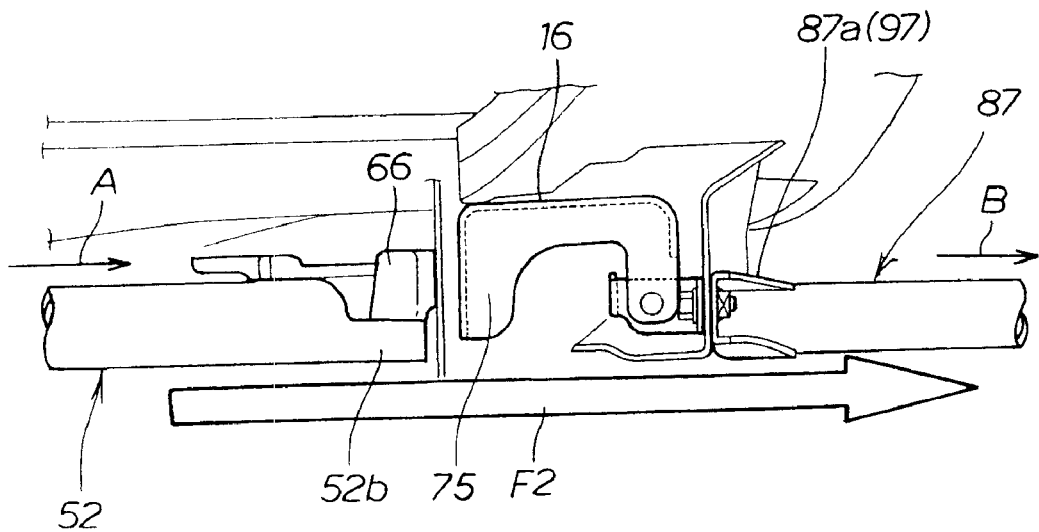

VEHICLE BODY SIDE STRUCTURE

FIELD OF THE INVENTION

The present invention relates to a vehicle body side structure which includes a door openably and closeably attached via a hinge to a front part of an opening of a vehicle body, and a door beam provided within the door and extending longitudinally of the vehicle body.

BACKGROUND OF THE INVENTION

In the vehicle body side structure disclosed in Japanese Patent Application Laid-Open Publication No. 2001-206244 (JP-A 2001-206244), a door beam is provided along a vehicle body longitudinal direction to an inside part of a door, a front end of the door beam is provided in proximity to a hinge, and a reinforcing member is provided on the vehicle-forward side of the hinge (i.e. in a front part of the vehicle body). The rigidity of the front part of the vehicle body can be increased by providing the reinforcing member to the side of the hinge facing the front of the vehicle body (front part of the vehicle body).

However, in this vehicle body side structure, since the front end of the door beam is provided in proximity to the hinge, the front end of the door beam is separated from the hinge. Therefore, a load acted on the hinge from the front of the vehicle body cannot be efficiently transferred to the door beam via the front end of the door beam.

Furthermore, the reinforcing member provided on the side of the hinge facing the front of the vehicle body is joined to a pillar in a state of being offset from the door beam in a vehicle width direction. The door (door beam) is provided to this pillar via the hinge. Therefore, a load acted on the reinforcing member from the front of the vehicle body is transferred to the door beam via the pillar. Thus, it is difficult to efficiently transfer the load to the door and disperse the load by transferring the load to the door beam via the pillar.

Thus, since it is difficult to efficiently transfer the load acting from the front of the vehicle body to the door beam and disperse the load, the load acting from the front of the vehicle body must be borne by the vehicle body (particularly a side sill). Consequently, in order to insure rigidity in the side sill, the side sill must be reinforced by a reinforcing member, and this has been an obstacle to minimizing the weight of the side sill (vehicle body).

SUMMARY OF THE INVENTION

It is therefore an object of the present invention to provide a vehicle body side structure whereby a load acting from the front of the vehicle body is efficiently transferred to the door and dispersed, whereby the load on the side sill can be reduced.

According to an aspect of the present invention, there is provided a vehicle body side structure which comprises: a door being capable of opening and closing actions via a hinge relative to an opening formed in a vehicle body; a door beam provided to an inside part of the door and extending longitudinally of the vehicle body, the door beam having one end coupled with the hinge; and a load-transmitting member, provided at a front part of the hinge, for transferring a load acted from a front part of the vehicle body toward a rear part of the vehicle body via the hinge, wherein the hinge includes an attachment part provided to the vehicle body, and a coupling part rotatably supported on the attachment part and coupled with the door beam, the attachment part having an attachment part body provided to the vehicle body, and a bearing, extending from the attachment part body along a rear part of the load-transmitting member, for bearing a load acted from the load-transmitting member.

In this arrangement, a load acted on the load-transmitting member from the front of the vehicle body can be borne by the bearing and transferred to the rear of the vehicle body via the hinge. One end of the door beam is coupled with the hinge. Consequently, a load acting from the front of the vehicle body can be efficiently transferred to the door beam via the hinge.

The door beam is provided along the vehicle longitudinal direction to an inside part of the door. Consequently, a load acting from the front of the vehicle body can be efficiently transferred to the door. Thus, the load transferred to a side sill is minimized by efficiently dispersing the load acting from the front of the vehicle body to the door. It is thereby possible to minimize the rigidity of the side sill and to reduce the weight of the side sill.

Preferably, the load-transmitting member is positioned between the hinge and a front wheel and comprises an interaction for transferring a load acted from the front wheel to the bearing. As a result, the load acting from the front wheel can be quickly transferred to the door beam (i.e. the door) via the interaction and the hinge. Additionally, the interaction is collapsed (deformed) by the load acting from the front wheel, whereby the load acting from the front wheel can be absorbed. The loads transferred to the door beam (door) and the side sill can thereby be minimized, and the weight of the side sill can be more favorably reduced.

Desirably, the interaction includes a base provided on the front part of the hinge, and an extending part continuing from the base and extending transversely farther inwardly of the vehicle body than the position of the hinge, the extending part being designed to have a collapse load less than a collapse load of the base. In this arrangement, a wider bearing surface of the load acting from the front wheel (a load-bearing surface) can be ensured. The load acted from the front wheel can be dispersed throughout the entire load-bearing surface, and the load can be reliably borne by the load-bearing surface.

The collapse load of the extending part is also designed to be less than the collapse load of the base. Consequently, a greater load can be borne by the base than by the extending part. The base is provided on the side of the hinge facing the front of the vehicle body, and the extending part is provided farther inward in the direction of vehicle width than the hinge. Consequently, a comparatively large load from the load acting from the front wheel can be transferred (dispersed) to the door beam (the door) via the base, and a comparatively small load can be transferred (dispersed) to the vehicle body via the extending part. Reducing the load dispersed to the vehicle body in this manner eliminates the need to increase the rigidity of the vehicle body any more than is necessary, and makes it possible to minimize the weight of the vehicle body.

In a preferred form, the bearing protrudes from a front end of the attachment part body in a vehicle-body-width direction, and the base of the interaction is provided pivotally via a pivot shaft to a vehicle-body-width-direction outer end of the bearing. Thus, when a load acts on the extending part of the interaction, a force acts so as to cause the interaction to pivot toward the hearing about the pivot shaft as an axis. The interaction is thereby pushed against the bearing, and the interaction can be reliably supported by the bearing. Therefore, the load acted on the interaction can be reliably transferred (dispersed) to the door beam (the door) via the bearing (i.e. the hinge).

In another preferred form, the door comprises a front door and a rear door aligned longitudinally of the vehicle body, the rear door being capable of opening and closing actions via a rear hinge relative to an opening formed in a rear part of the vehicle body, and a rear door beam is provided to an inside part of the rear door in such a manner as to extend longitudinally of the vehicle body, the rear door beam having an end coupled with the rear hinge, so that a load acted on the rear hinge from the door beam within the front door is transferred to the rear door beam via the end of the rear door beam and the door beam within the front door functions as a load-transmitting member for transferring the load to the rear door beam. Thus, a load acting from the front of the vehicle body can be transferred to the two front and rear doors of the door beam (the door) and the rear door beam (the rear door). The load acting from the front of the vehicle body can be efficiently transferred to the front and rear doors, the load dispersed to the vehicle body can be further reduced, and the weight of the vehicle body can be further minimized.

An opposite end of the door beam may be coupled with a rear part of the front door via a bracket. The bracket may have inhibiting parts for inhibiting the vertical movement of the door beam. As a result, the load transferred to the door beam is transferred in the axial longitudinal direction of the door beam. The door beam and other long members have the characteristic of not readily deforming under loads in the axial longitudinal direction in comparison with loads in the bending direction. The load transferred to the door beam can thereby be suitably supported by the door beam and reliably transferred to the rear of the vehicle body.

In a further preferred form, for holding the door closed over the vehicle body opening, one of a latch and a striker is provided in the vicinity of an opposite end of the door beam within the door while another of the latch and striker is provided to a rear part of the vehicle body opening, the latch being capable of latching onto the striker. Thus, the load transferred to the door beam can be transferred to the rear part of the vehicle body opening via the latch and the striker. The rear part of the vehicle body opening is formed in a pillar. Consequently, the load transferred to the rear part of the vehicle body opening can be suitably supported by the pillar.

BRIEF DESCRIPTION OF THE DRAWINGS

Certain preferred embodiments of the present invention will be described in detail below, by way of example only, with reference to the accompanying drawings, in which:

FIG. 12 is a schematic view showing a load being transferred from a front wheel to the front part of the vehicle body side structure;

FIG. 13 is a schematic view showing a load being transferred from a front door beam to a rear door beam;

DETAILED DESCRIPTION OF THE PREFERRED EMBODIMENTS

Figure 1:
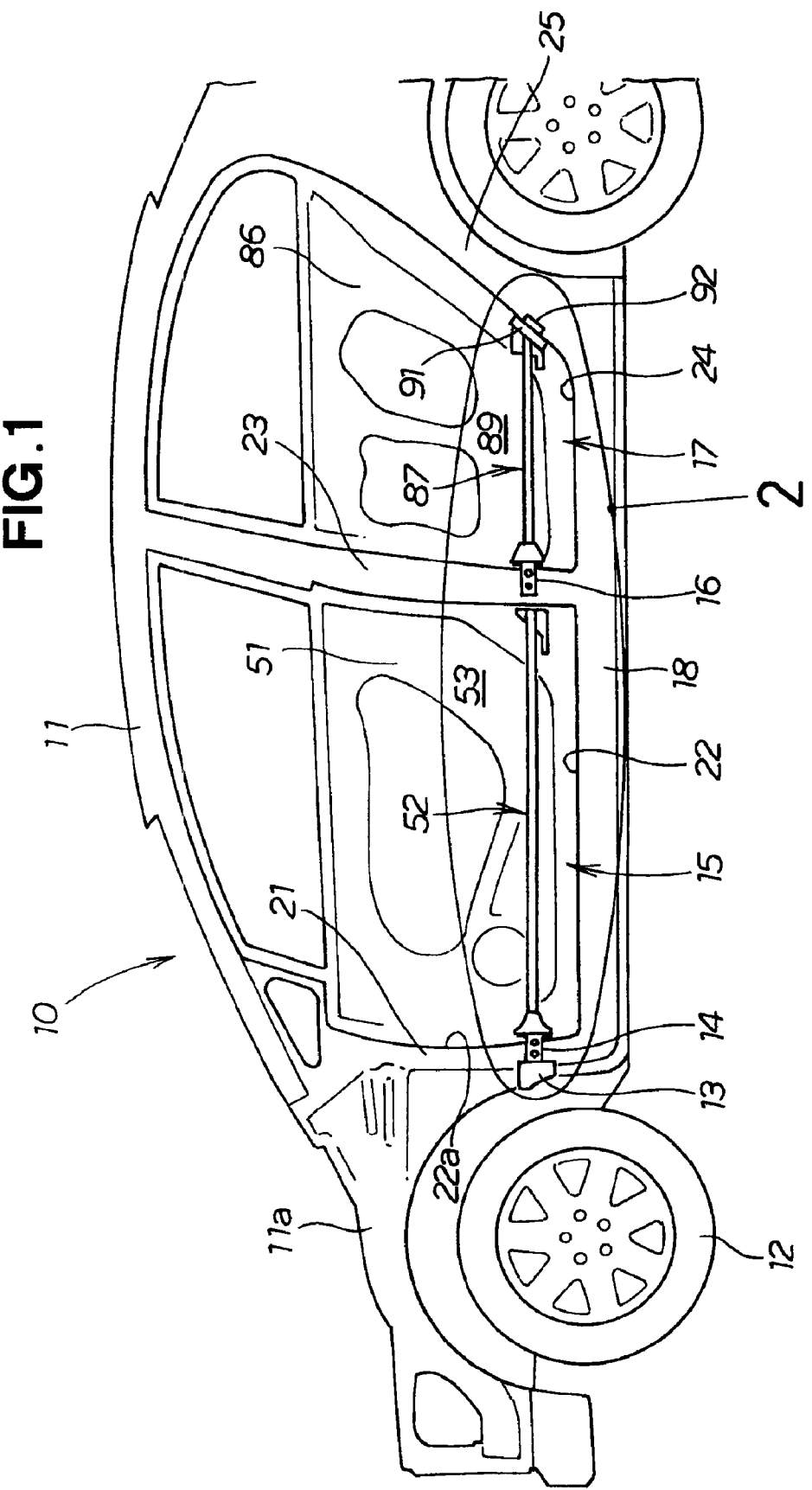
FIG. 1 is a side elevational view illustrating a vehicle including a vehicle body side structure according to the present invention.

A vehicle body side structure 10 comprises a vehicle body 11, a front wheel 12 provided to a front part 11a of the vehicle body 11, a load-transmitting member 13 provided to the side of the front wheel 12 facing the rear of the vehicle body, a front hinge (hinge) 14 provided to the side of the load-transmitting member 13 facing the rear of the vehicle body, a front door (door) 15 provided to be capable of opening and closing via the front hinge 14, a rear hinge 16 provided on the side of the front door 15 facing the rear of the vehicle body, and a rear door 17 provided to be capable of opening and closing via the rear hinge 16.

Figure 2:
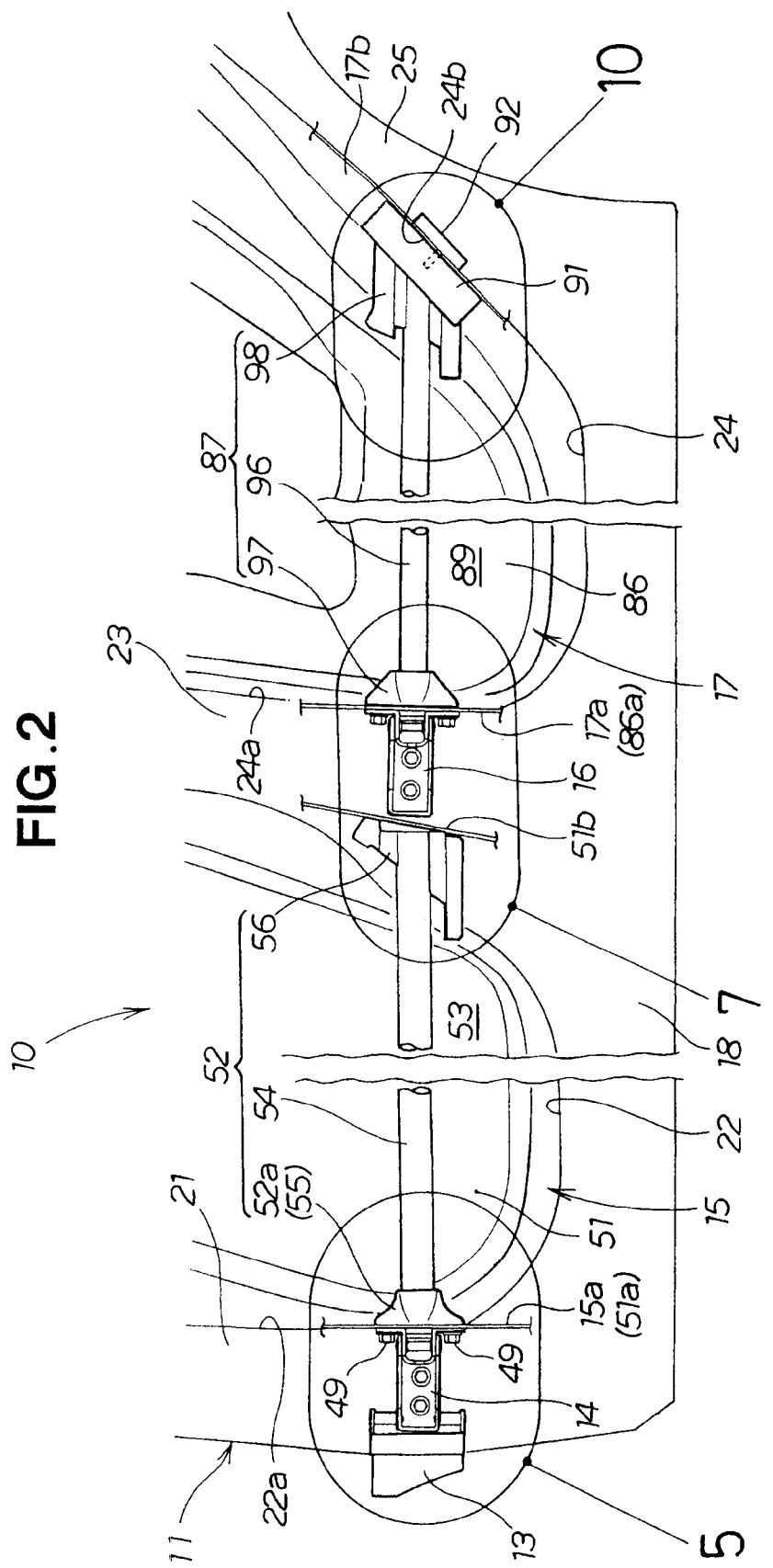
FIG. 2 is an enlarged view showing area 2 of FIG. 1.

In the vehicle body 11, a front pillar 21 is provided on the side of the front wheel 12 facing the rear of the vehicle body, a front vehicle body opening (vehicle body opening) 22 is provided facing the rear of the vehicle body from the front pillar 21, a center pillar 23 is provided on the side of the front vehicle body opening 22 facing the rear of the vehicle body, a rear vehicle body opening 24 is provided on the side of the center pillar 23 facing the rear of the vehicle body, and a rear pillar 25 is provided on the side of the rear vehicle body opening 24 facing the rear of the vehicle body, as shown in FIGS. 1 and 2.

Furthermore, in the vehicle body 11, a side sill 18 is provided to the lower part of the front pillar 21, the lower part of the center pillar 23, and the lower part of the rear pillar 25. The side sill 18 extends in the longitudinal direction of the vehicle body along the lower parts of the front door 15 and the rear door 17.

The load-transmitting member 13 is disposed behind the front wheel 12 and provided on the side of the front hinge 14 facing the front of the vehicle body, thereby providing an interaction between the front wheel 12 and the front hinge 14. The load-transmitting member 13 is hereinbelow described as an interaction 13. The interaction 13 is provided to the front pillar 21 and the front hinge 14.

Figure 3:
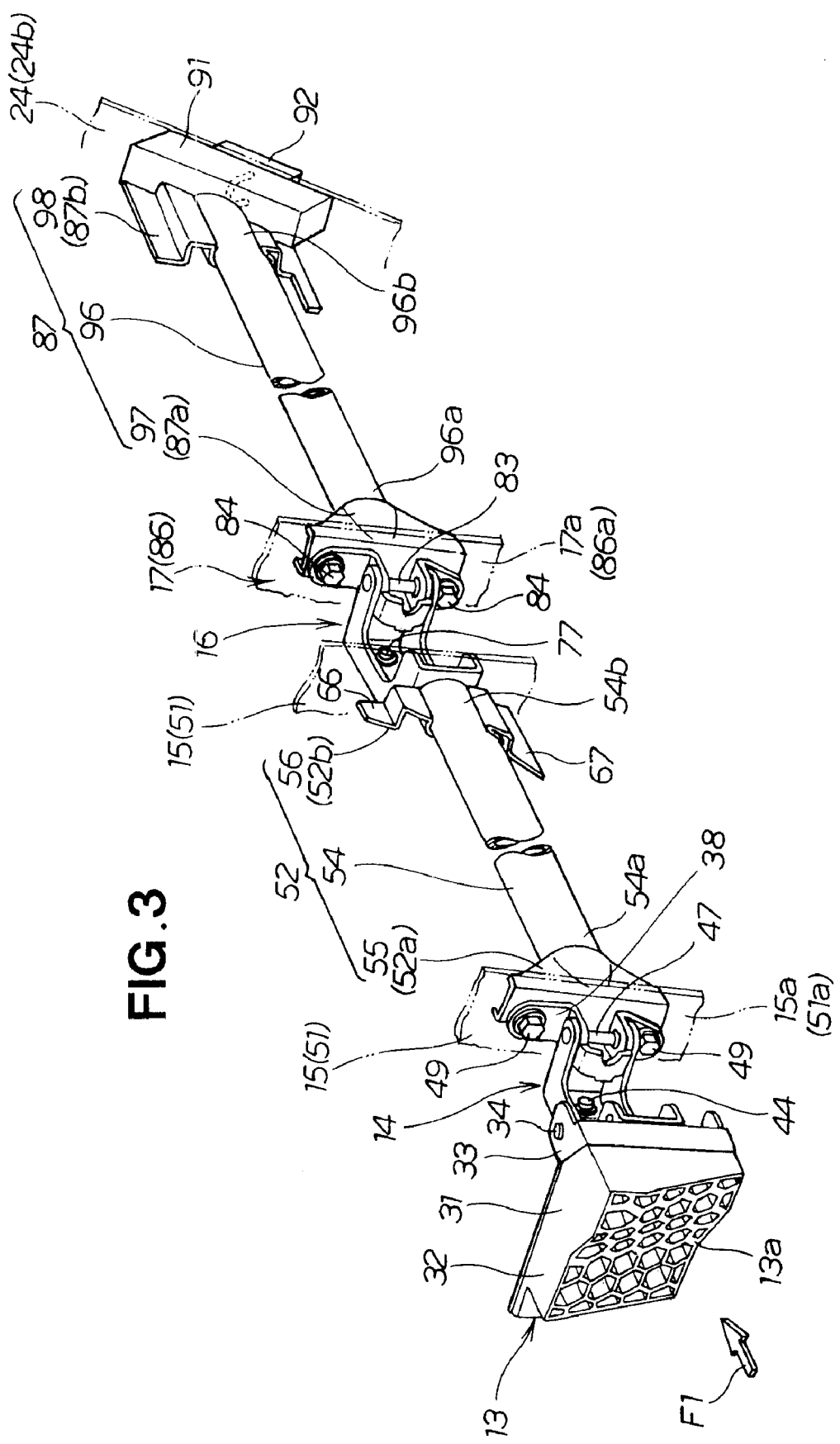
FIG. 3 is a perspective view illustrating the vehicle body side structure of FIG. 1.
Figure 4:
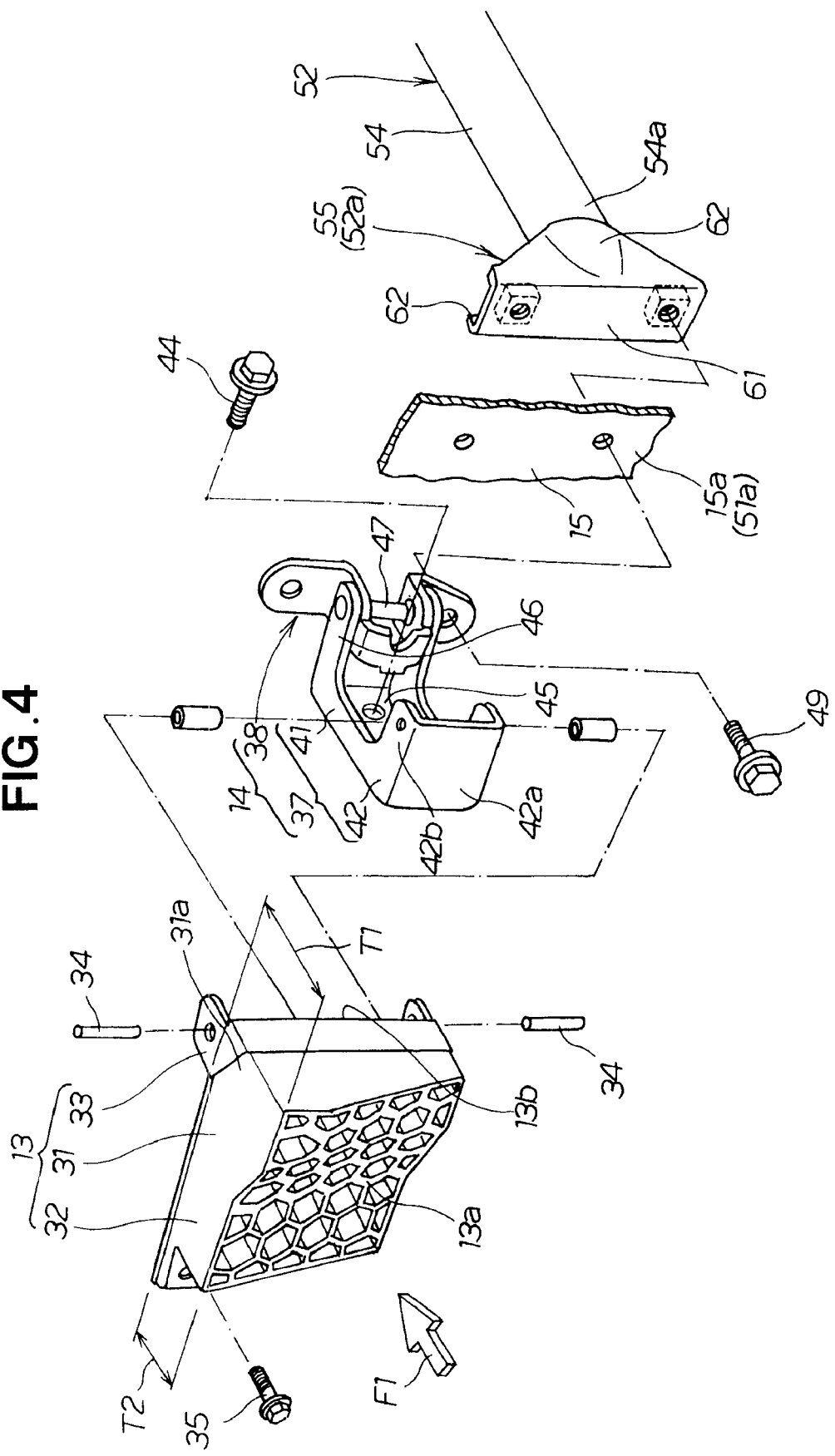
FIG. 4 is an exploded perspective view showing a front part of the vehicle body side structure of FIG. 3.

The interaction 13 has a base 31 provided on the side of the front hinge 14 facing the front of the vehicle body, an extending part 32 continuing from the base 31 and extending farther inward in the vehicle width direction than the front hinge 14, and a support part 33 provided on a vehicle-width external rear end 31a of the base 31, as shown in FIGS. 3 and 4. The support part 33 is provided to the front hinge 14 to be capable of pivoting via a pivot shaft 34 composed of a pair of pins. The extending part 32 is attached to the vehicle body 11 by a bolt 35.

The reason for providing the support part 33 to the front hinge 14 so as to be capable of pivoting via a pair of pivot pins 34 is described hereinafter.

The interaction 13 is placed between the front hinge 14 and the front wheel 12, so that a load F1 acting from the front wheel 12 is transferred to the front hinge 14 via the interaction 13. The load F1 acting from the front wheel 12 is thereby quickly transferred to the front door 15 via the interaction 13 and the front hinge 14.

Furthermore, the interaction 13 is provided with the base 31 and the extending part 32, whereby a large load-bearing surface 13a can be ensured for the load F1 acting from the front wheel 12. The load F1 acting from the front wheel 12 is dispersed throughout the entire load-bearing surface 13a and, loads can be reliably borne by the load-bearing surface 13a.

The base 31 and the extending part 32 are formed with honeycomb structures capable of absorbing some of the load F1 by collapsably deforming under the load F1 from the front of the vehicle body. Specifically, the interaction 13 collapses, i.e. deforms under the load F1 acting from the front wheel 12, whereby some of the load F1 acting from the front wheel 12 is absorbed. It is thereby possible to minimize the load transferred to the front door 15 and the vehicle body 11 (e.g. the side sill 18), and the weight of the side sill 18 is reduced by minimizing the rigidity of the side sill 18.

The collapse load of the extending part 32 is designed to be less than the collapse load of the base 31. The term "collapse load" refers to the load at which a member elastically deforms, i.e., the maximum load that the member is capable of withstanding. Designing the collapse load of the base 31 to be greater than the collapse load of the extending part 32 enables the base 31 to bear (withstand) a greater load than the extending part 32.

Furthermore, the base 31 is provided in parallel with the front hinge 14 on the side facing the front of the vehicle body, and the extending part 32 is provided on the side of the front hinge 14 facing the front of the vehicle body and inward in the vehicle width direction from the front hinge 14. Consequently, from the load F1 acting from the front wheel 12, a comparatively large load can be transferred (dispersed) to the front hinge 14 via the base 31, and a comparatively small load can be transferred and dispersed to the vehicle body 11 via the extending part 32. Thus, the load disperse to the vehicle body 11 is reduced, whereby there is no need to increase the rigidity of the vehicle body 11 any more than necessary, and the weight of the vehicle body 11 can be minimized.

Furthermore, the base 31 is formed having a greater width dimension T1 than the width dimension T2 of the extending part 32. Consequently, some of the load F1 acting from the front wheel 12 is quickly transferred (dispersed) to the front door 15 via the interaction 13 and the front hinge 14, and after the base 31 has collapsed (deformed), some of the load F1 can be transferred (dispersed) to the extending part 32. Some of the load F1 acting from the front wheel 12 can thereby be more efficiently transferred to the front door 15 via the interaction 13 and the front hinge 14.

Figure 5:
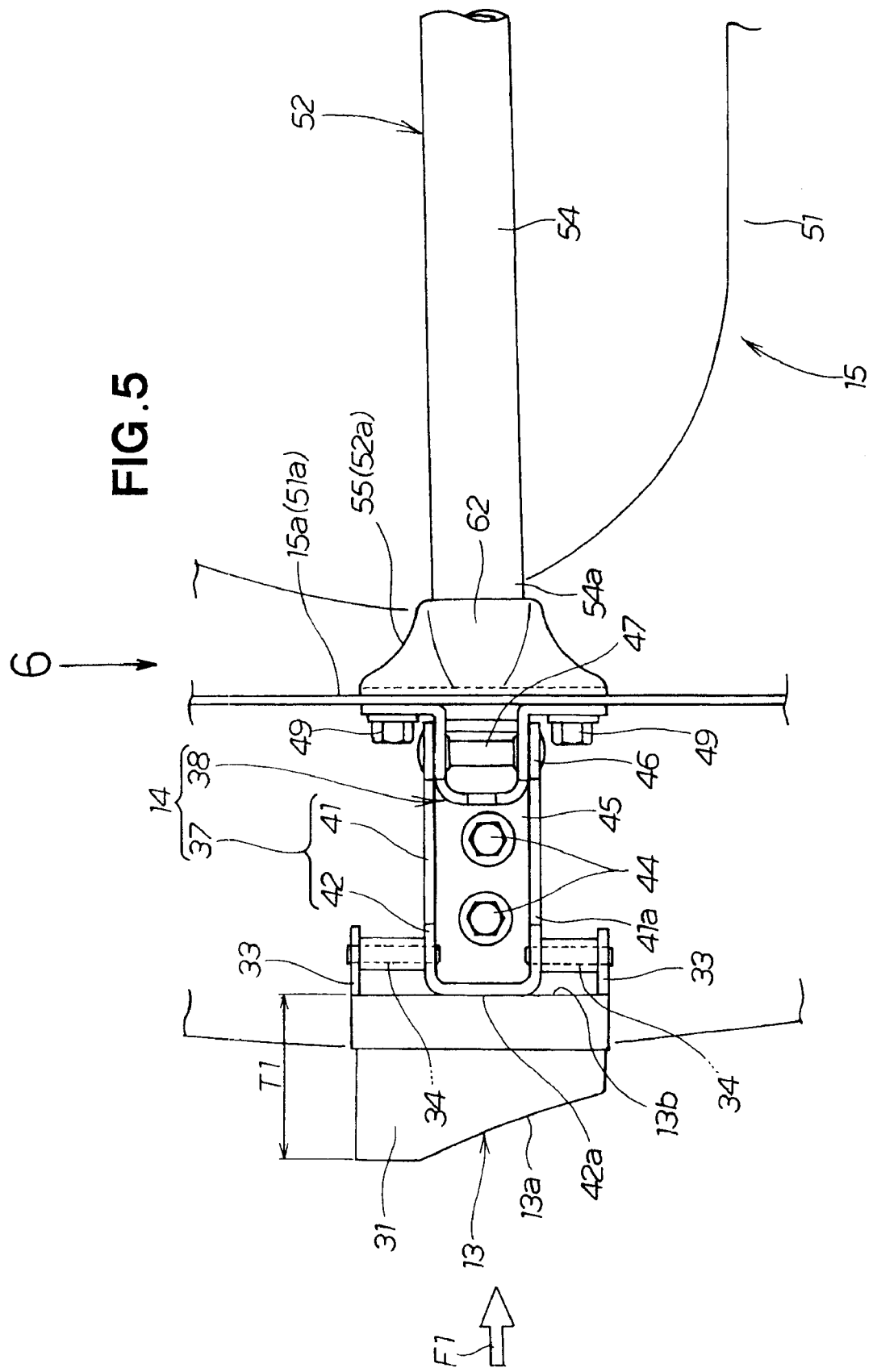
FIG. 5 is an enlarged view showing area 5 of FIG. 2.
Figure 6:
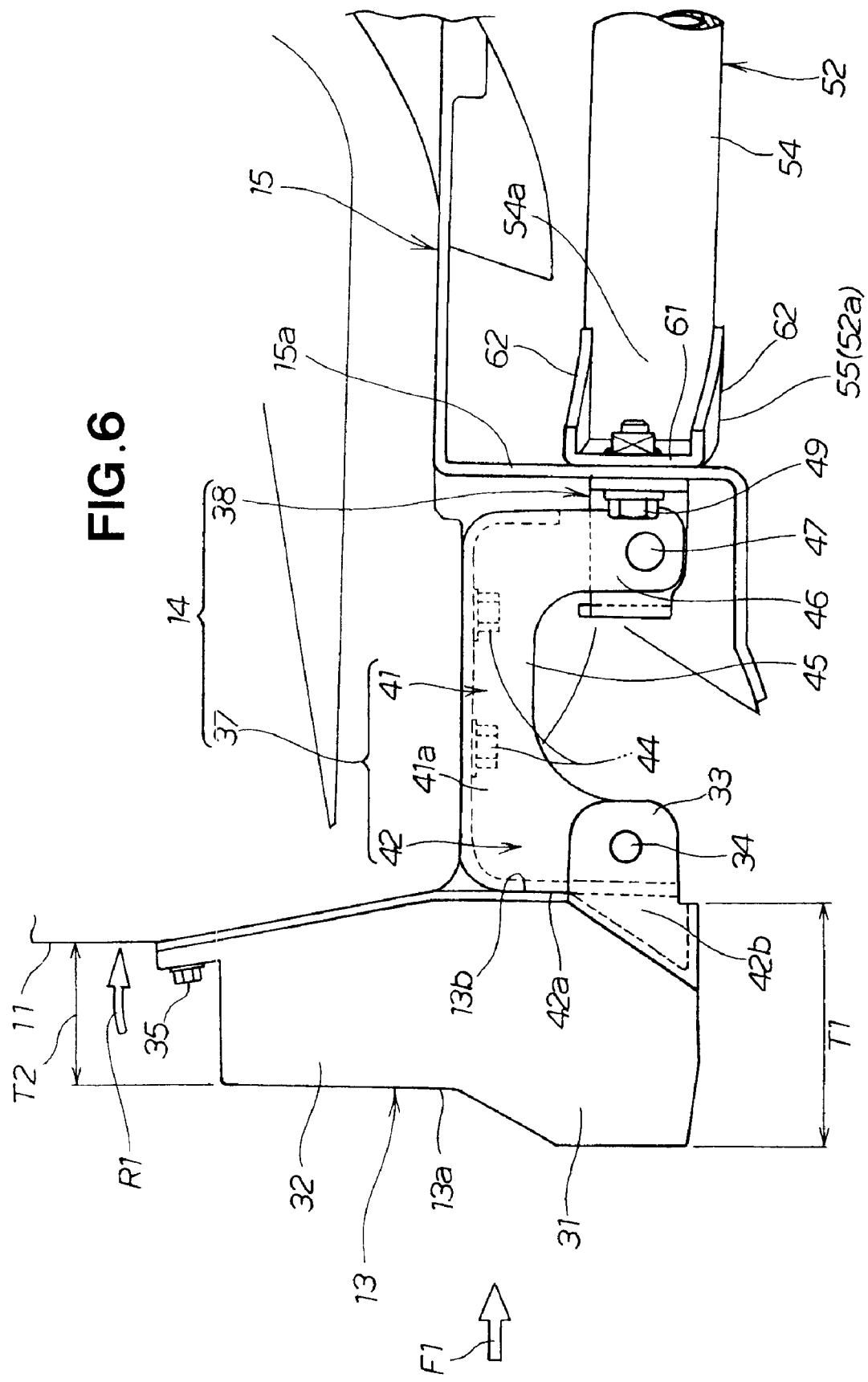
FIG. 6 is a view seen in the direction of arrow 6 of FIG. 5.

The front hinge 14 comprises a front attachment part (attachment part) 37 provided to the front pillar 21 (FIG. 2) of the vehicle body 11, and a front coupling part (coupling part) 38 rotatably supported on the front attachment part 37, as shown in FIGS. 4 through 6.

The front attachment part 37 has a front attachment part body (attachment part body) 41 provided to the front pillar 21, and a front bearing (bearing) 42 protruding along a rear part 13b of the interaction 13 from a front end 41a of the front attachment part body 41. The front attachment part 37 is formed into a substantial U shape (FIGS. 4 and 6) by the front attachment part body 41 and the front bearing 42.

The front attachment part body 41 has a front pillar attachment part 45 attached to the front pillar 21 by a plurality of bolts 44, and a front door-connecting part 46 protruding outward in the vehicle width direction from the rear end of the front pillar attachment part 45. The front coupling part 38 is connected to the front door-connecting part 46 so as to be capable of pivoting in a substantially horizontal direction via a front support pin 47.

The front bearing 42 protrudes outward in the vehicle width direction along the rear part 13b of the interaction 13 from the front end 41a of the front attachment part body 41, and bears loads acting from the interaction 13. A front end 42a of the front bearing 42 is in contact with the rear part 13b of the interaction 13.

The support part 33 of the interaction 13 is provided to an end part 42b on the external side of the front bearing 42 in the vehicle width direction, the support part 33 being capable of pivoting via the pair of pivot pins 34 as previously described.

When a load acts on the extending part 32 of the interaction 13 from the front wheel 12, a force acts as shown by the arrow R1 so as to pivot the interaction 13 toward the front bearing 42 about the pair of pivot pins 34 as an axis. Consequently, the interaction 13 is pushed against the front bearing 42, and the interaction 13 can be reliably supported by the front bearing 42 (the front end 42a). A load acted on the interaction 13 from the front wheel 12 can thereby be reliably transferred to the front bearing 42 (i.e. the front attachment part 37) via the support part 33 of the interaction 13. The load transferred to the front bearing 42 is transferred to the front coupling part 38 via the front attachment part 37.

The front coupling part 38 is pivotably linked via the front support pin 47 to the front door-connecting part 46 of the front attachment part body 41. The front coupling part 38 is coupled with a front end 15a of the front door 15 by a plurality of bolts 49. Consequently, the front door 15 is supported on the vehicle body 11 (the front pillar 21) so as to be capable of opening and closing about the front support pin 47 as an axis.

The front door 15 is provided to a front part 22a of the front vehicle body opening 22 so as to be capable of opening and closing via the front hinge 14, as shown in FIGS. 1 and 2. The front door 15 comprises a front door panel 51 formed into a substantially rectangular shape and capable of opening and closing over the front vehicle body opening 22, and a front door beam (door beam) 52 provided along the vehicle longitudinal direction to an inside part 53 of the front door panel 51.

In the front door 15, a front end 51a of the front door panel 51 and a front end (one end) 52a of the front door beam 52 are coupled with the front coupling part 38 by the plurality of bolts 49.

The front door beam 52 comprises a cylindrical front beam body 54, a front bracket 55 provided to a front end 54a of the front beam body 54, and a rear bracket (a bracket) 56 provided to a rear end (the other end) 54b of the front beam body 54, as shown in FIG. 3.

The front end 52a of the front door beam 52 is formed by the front bracket 55 and the front end 54a of the front beam body 54. A rear end 52b of the front door beam 52 is formed by the rear bracket 56 and the rear end 54b of the front beam body 54.

The front bracket 55 is a plate bent into a substantial U shape in a plan view (FIG. 6), and the front bracket 55 has a front connecting part 61 provided to the front coupling part 38 via the front door panel 51 (the front end 51a), and a pair of front bent pieces 62 bent towards the rear of the vehicle body from the inside and outside ends of the front connecting part 61, as shown in FIGS. 4 through 6.

The front end 54a of the front beam body 54 is fitted between the pair of front bent pieces 62. The front connecting part 61 of the front bracket 55 is attached by the plurality of bolts 49 to the front coupling part 38 via the front end 51a of the front door panel 51. Consequently, the front end 52a of the front door beam 52 (the front bracket 55) is provided to the front coupling part 38. Consequently, the load transferred to the front coupling part 38 via the front bearing 42 (i.e. the front attachment part 37) is transferred to the front bracket 55 via the front coupling part 38 and the front end 51a of the front door panel 51. The load transferred to the front bracket 55 is then transferred to the vehicle body via the front beam body 54.

Figure 7:
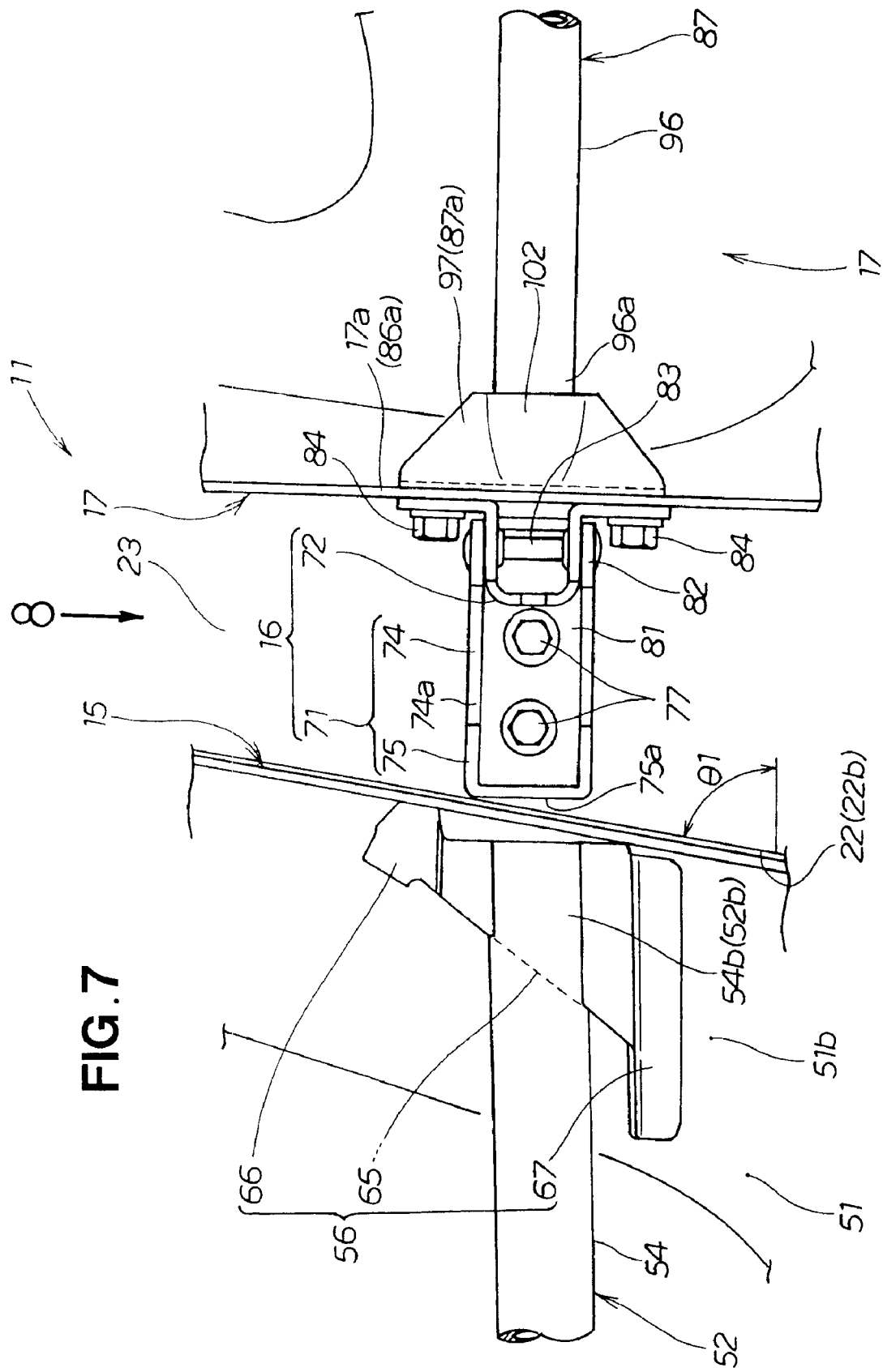
FIG. 7 is an enlarged view showing area 7 of FIG. 2.
Figure 8:
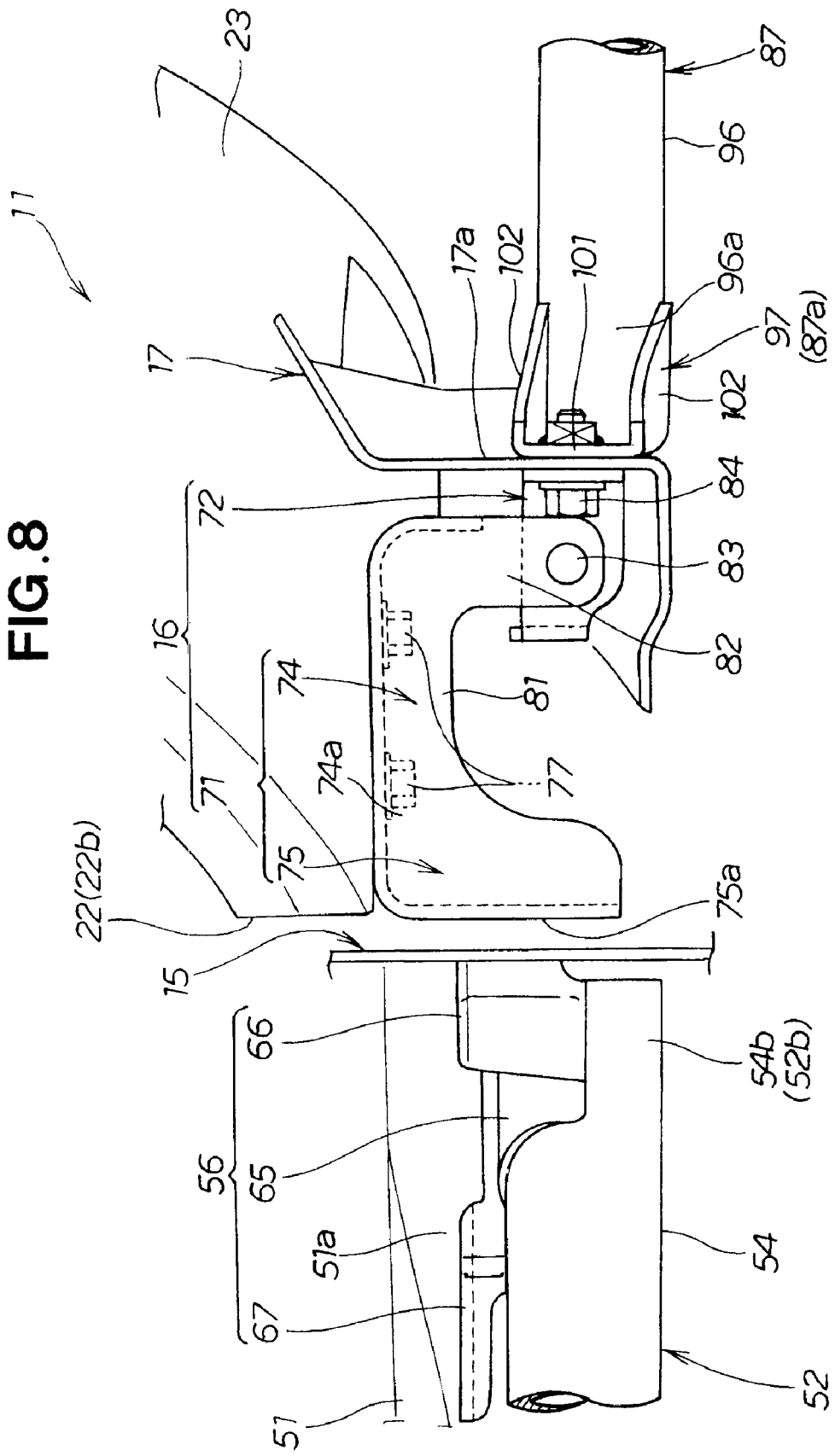
FIG. 8 is a view seen in the direction of arrow 8 of FIG. 7.

The rear bracket 56 has a joining part 65 provided to the rear end 54b of the front beam body 54, an upper inhibiting part 66 protruding upward from the joining part 65, and a lower inhibiting part 67 protruding downward from the joining part 65, as shown in FIGS. 7 and 8. The upper and lower inhibiting parts 66, 67 are joined to a rear end 51b of the front door panel 51. Consequently, in the front beam body 54, the rear end 54b is coupled with the rear end 51b of the front door panel 51 via the rear bracket 56.

A rear end 22b of the front vehicle body opening 22 is inclined toward the rear of the vehicle body at an upward slope with an angle of inclination θ1. Therefore, in a case in which a load acts on the front beam body 54 toward the rear of the vehicle body and the rear end 54b of the front beam body 54 in contact with the rear end 22b, the rear end 54b of the front beam body 54 presumably moves upward along the rear end 22b.

The rear end 54b of the front beam body 54 is therefore coupled with the rear end 51b of the front door panel 51 via the rear bracket 56. Consequently, the upward movement of rear end 54b of the front beam body 54 along the rear end 22b can be regulated by the rear bracket 56. A load transferred to the front beam body 54 can thereby be transferred along the axial longitudinal direction of the front beam body 54.

The front door beam 52 and other such long members have the characteristic of not readily deforming under loads in the axial longitudinal direction in comparison with loads in the bending direction. The load transferred to the front door beam 52 can thereby be suitably supported by the front door beam 52 and reliably transferred to the rear of the vehicle body.

Figure 9:
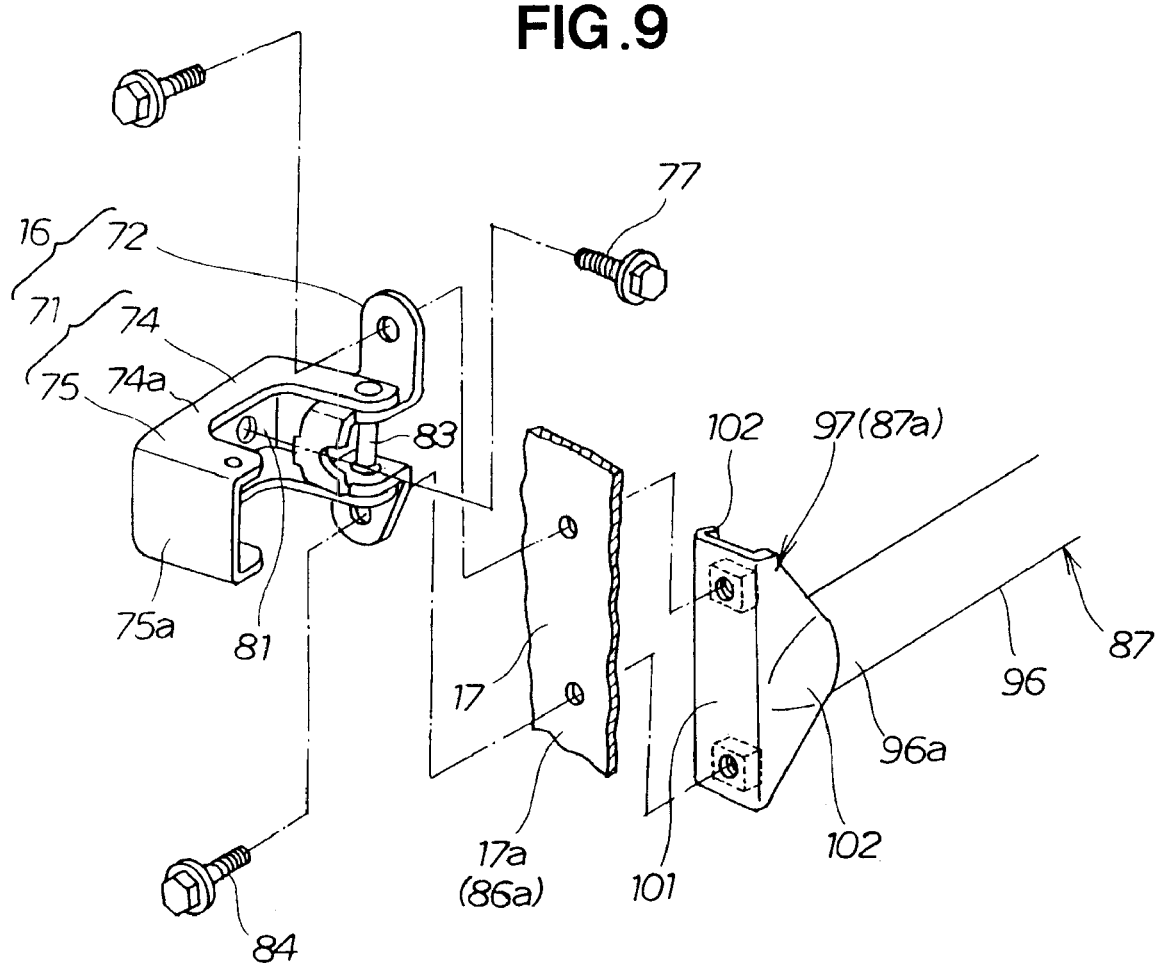
FIG. 9 is an exploded perspective view showing a central part of the vehicle body side structure of FIG. 3.

The rear hinge 16 is provided to the rear of the front door 15 (see FIGS. 1 and 2) as shown in FIGS. 7 through 9. The rear hinge 16 is a member formed in the same manner as the front hinge 14, and comprises a rear attachment part 71 provided to the center pillar 23 of the vehicle body 11, and a rear coupling part 72 rotatably supported on the rear attachment part 71.

The rear attachment part 71 has a rear attachment part body 74 provided to the center pillar 23, and a rear bearing 75 protruding along the rear end 52b of the front door beam 52 from the rear attachment part body 74. The rear attachment part 71 is formed into a substantial U shape in a plan view (FIG. 8) by the rear attachment part body 74 and the rear bearing 75.

The rear attachment part body 74 has a center pillar attachment part 81 attached to the center pillar 23 by a plurality of bolts 77, and a rear door-connecting part 82 protruding outward in the vehicle width direction from the rear end of the center pillar attachment part 81. The rear coupling part 72 is connected to the rear door-connecting part 82 so as to be capable of pivoting in a substantially horizontal direction via a rear support pin 83.

The rear bearing 75 protrudes outward in the vehicle width direction along the rear end 52b of the front door beam 52 (the rear end 54b of the front beam body 54) from a front end 74a of the rear attachment part body 74. A front wall 75a of the rear bearing 75 is provided in proximity to the rear end 52b of the front door beam 52. The rear bearing 75 bears a load acting from the front door beam 52 in a state in which the front end 52b of the front door beam 52 is in contact with the front wall 75a. Consequently, the load acting from the front door beam 52 is transferred to the rear bearing 75 (i.e. the rear attachment part 71) via the rear end 52b of the front door beam 52. The load transferred to the rear bearing 75 is then transferred to the rear coupling part 72 via the rear attachment part 71.

The rear coupling part 72 is pivotably connected via the rear support pin 83 to the rear door-connecting part 82 of the rear attachment part body 74. The rear coupling part 72 is coupled with a front end 17a of the rear door 17 by a plurality of bolts 84. Consequently, the rear door 17 is supported on the vehicle body 11 (the center pillar 23) so as to be capable of opening and closing about the rear support pin 83 as an axis.

The rear door 17 is provided on a front end 24a of the rear vehicle body opening 24 so as to be capable of opening and closing via the rear hinge 16, as shown in FIGS. 1 and 2. The rear door 17 comprises a rear door panel 86 formed into a substantially rectangular shape and capable of opening and closing over the rear vehicle body opening 24, a rear door beam (a door beam) 87 provided along the vehicle longitudinal direction to an inside part 89 of the rear door panel 86, and a latch 91 provided to a rear end vicinity (the other end vicinity) 17b of the rear door beam 87.

In the rear door 17, a front end 86a of the rear door panel 86 and a front end (one end) 87a of the rear door beam 87 are attached by a plurality of bolts 84 to the rear coupling part 72, as shown in FIG. 3.

The rear door beam 87 comprises a cylindrical rear beam body 96, a front bracket 97 provided to a front end 96a of the rear beam body 96, and a rear bracket (a bracket) 98 provided to a rear end (the other end) 96b of the rear beam body 96.

The front end 87a of the rear door beam 87 is formed by the front bracket 97 and the front end 96a of the rear beam body 96. A rear end 87b of the rear door beam 87 is formed by the rear bracket 98 and the rear end 96b of the rear beam body 96.

The front bracket 97 is a plate bent into a substantial U shape in a plan view, similar to the front bracket 55, and has a front connecting part 101 provided to the rear coupling part 72 via the rear door panel 86 (the front end 86a), and a pair of front bent pieces 102 bent toward the rear of the vehicle body from the inside and outside ends of the front connecting part 101, as shown in FIGS. 7 through 9.

The front end 96a of the rear beam body 96 is fitted between the pair of front bent pieces 102. The front connecting part 101 of the front bracket 97 is coupled by the plurality of bolts 84 to the rear coupling part 72 via the front end 86a of the rear door panel 86. Consequently, the front end 87a of the rear door beam 87 (the front bracket 97) is attached to the rear coupling part 72. Consequently, the load transferred to the rear coupling part 72 via the rear bearing 75 (i.e. the rear attachment part 71) is transferred to the front bracket 97 via the rear coupling part 72 and the front end 86a of the rear door panel 86. The load transferred to the front bracket 97 is then transferred toward the rear of the vehicle body via the rear beam body 96.

Figure 10:
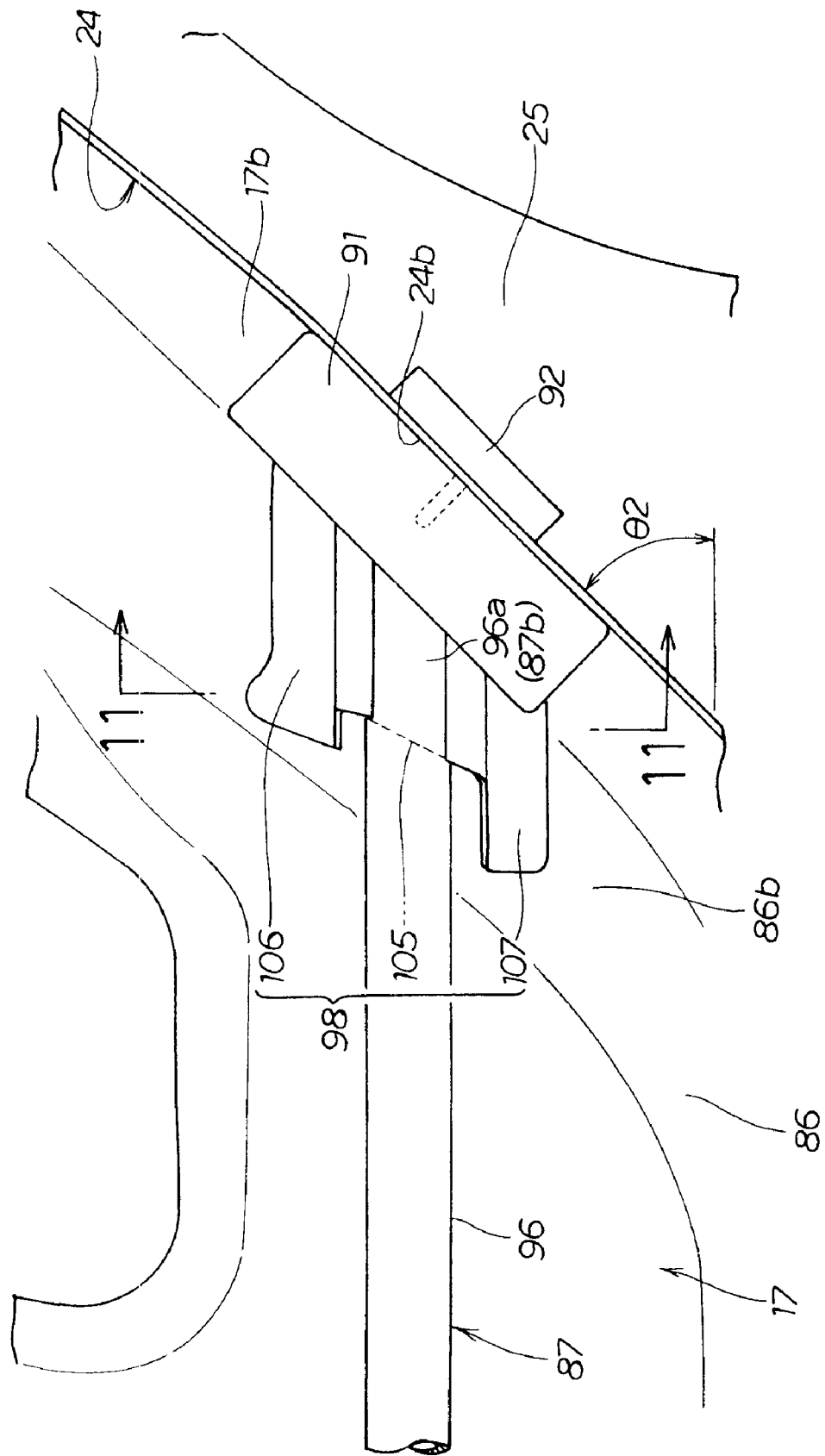
FIG. 10 is an enlarged view showing area 10 of FIG. 2.
Figure 11:
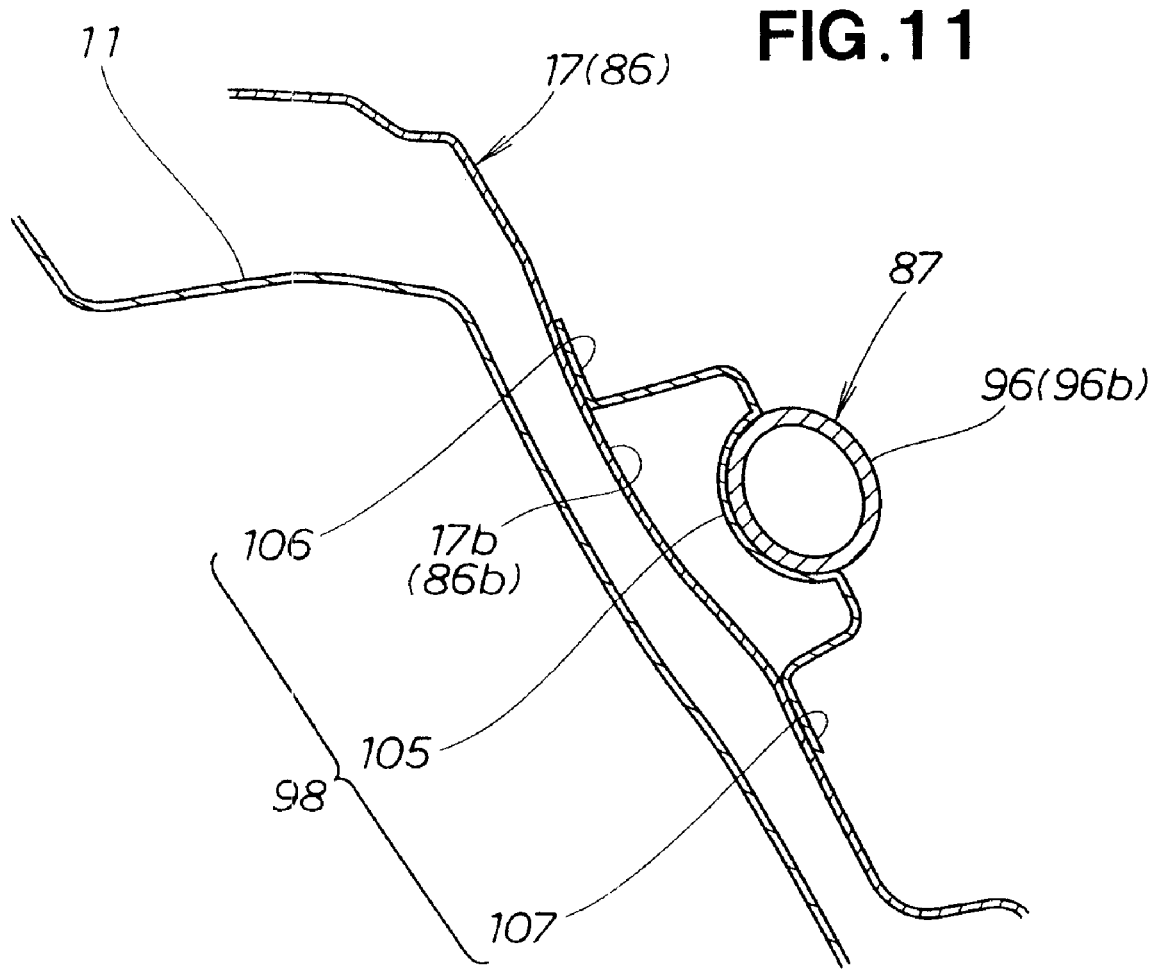
FIG. 11 is an enlarged cross-sectional view taken along line 11-11 of FIG. 10.

The rear bracket 98 has a joining part 105 provided to the rear end 87b of the rear door beam 87, an upper inhibiting part (a inhibiting part) 106 protruding upward from the joining part 105, and a lower inhibiting part (a inhibiting part) 107 protruding downward from the joining part 105, as shown in FIGS. 10 and 11. The upper and lower inhibiting parts 106, 107 are joined to a rear end 86b of the rear door panel 86. Consequently, the rear end 87b of the rear door beam 87 is coupled with the rear end 86b of the rear door panel 86 via the rear bracket 98.

The upper and lower inhibiting parts 106, 107 are joined to the rear end 86b of the rear door panel 86, whereby the vertical movement of the rear door beam 87 can be regulated by the rear bracket 98.

In the rear door 17, the latch 91 is provided to the rear end vicinity 17b of the rear door beam 87 (specifically, on the side of the rear end 87b facing the rear of the vehicle body). The latch 91 is disposed on the side of the rear end 87b of the rear door beam 87 facing the rear of the vehicle body, and is a member capable of latching to a striker 92 in a state in which the rear door 17 is closed over the rear vehicle body opening 24. The striker 92 is provided in a rear part 24b of the rear vehicle body opening 24. Consequently, when the rear door 17 has been closed over the rear vehicle body opening 24, the rear door 17 can be kept in this closed state over the rear vehicle body opening 24 by latching the latch 91 to the striker 92.

The rear part 24b of the rear vehicle body opening 24 is inclined toward the rear of the vehicle body at an upward incline with an angle of inclination $\theta 2$. Therefore, in a case in which a load acts on the rear door beam 87 toward the rear of the vehicle body and the striker 92 comes in contact with the rear part 24b, the rear end 87b of the rear door beam 87 is presumed to move upward along the rear part 24b.

The rear end 87b of the rear door beam 87 is therefore coupled with the rear end 86b of the rear door panel 86 via the rear bracket 98. Consequently, the upward movement of the rear end 87b of the rear door beam 87 along the rear part 24b can be regulated by the rear bracket 98. The load transferred to the rear door beam 87 can thereby be transferred in the axial direction of the rear door beam 87.

The rear door beam 87 and other such long members have the characteristic of not readily deforming under loads in the axial direction in comparison with loads in the bending direction. The load transferred to the rear door beam 87 can thereby be suitably supported by the rear door beam 87 and reliably transferred to the rear of the vehicle body.

Latching the latch 91 onto the striker 92 when the rear door 17 has been closed over the rear vehicle body opening 24 makes it possible for the load transferred to the rear door beam 87 to be transferred to the rear part 24b of the rear vehicle body opening 24 via the latch 91 and the striker 92. The rear part 24b of the rear vehicle body opening 24 is formed on the rear pillar 25. Consequently, the load transferred to the rear part 24b of the rear vehicle body opening 24 can be suitably borne by the rear pillar 25.

Figure 14:
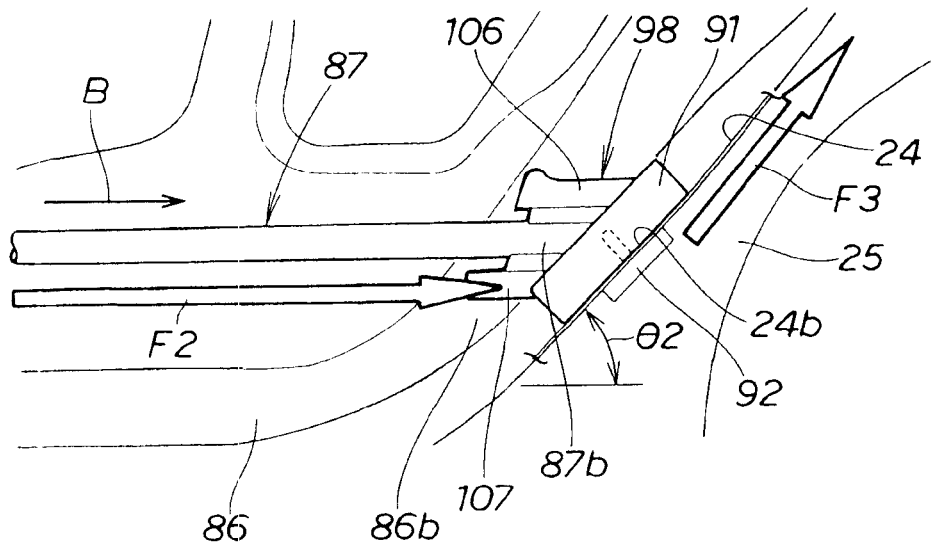
FIG. 14 is a schematic view showing a load being transferred to the rear part of the vehicle body side structure.

The following is a description, made with reference to FIGS. 12 through 14, of an example in which a load F1 acting from the front wheel 12 is borne by the vehicle body side structure 10.

A load acts on the front end of the vehicle body 11 from the front of the vehicle, whereby the front wheel 12 moves toward the rear of the vehicle body and comes in contact with the interaction 13, as shown in FIGS. 12(a) and (b). A load F1 acts on the interaction 13 from the front wheel 12.

The load F1 acting on the interaction 13 causes the base 31 and the extending part 32 of the interaction 13 to collapse (deform), and some of the load F1 is absorbed by the interaction 13.

The rest of the load F2 from the load F1 is transferred to the front hinge 14, and the load F2 transferred to the front hinge 14 is transferred to the front end 52a of the front door beam 52. The load F2 being transferred to the front end 52a of the front door beam 52 causes the front door beam 52 to move toward the rear of the vehicle body as shown by the arrow A, and the load F2 transferred to the front end 52a is transferred toward the rear of the vehicle body via the front door beam 52.

The front door beam 52 moving toward the rear of the vehicle body as shown by arrow A causes the rear end 52b of the front door beam 52 to come in contact with the rear bearing 75 of the rear hinge 16, as shown in FIGS. 13 (a) and (b). Consequently, the load F2 transferred toward the rear of the vehicle body via the front door beam 52 is transferred to the front end 87a of the rear door beam 87 via the rear hinge 16. In other words, the front door beam 52 fulfills the role of a load-transmitting member for transferring loads to the rear door beam 87.

The load F2 being transferred to the front end 87a of the rear door beam 87 causes the rear door beam 87 to move toward the rear of the vehicle body as shown by arrow B, and the load F2 transferred to the front end 87a of the rear door beam 87 is transferred toward the rear of the vehicle body via the rear door beam 87.

The rear door beam 87 moving toward the rear of the vehicle body as shown by arrow B cases both the latch 91 and the rear end 87b of the rear door beam 87 to move toward the rear of the vehicle body as shown by arrow B, as shown in FIG. 14. By moving toward the rear of the vehicle body as shown by arrow B, the latch 91 comes in contact with the rear part 24b of the rear vehicle body opening 24.

The rear part 24b of the rear vehicle body opening 24 is inclined toward the rear of the vehicle body at an upward incline with an angle of inclination $\theta 2$. The rear end 87b of the rear door beam 87 is therefore coupled with the rear end 86b of the rear door panel 86 via the rear bracket 98. Consequently, the upward movement of the rear end 87b of the rear door beam 87 along the rear part 24b can be regulated by the rear bracket 98. The load transferred to the rear door beam 87 can thereby be transferred in the axial direction of the rear door beam 87. Therefore, the load transferred to the rear door beam 87 can be suitably supported by the rear door beam 87 and reliably transferred toward the rear of the vehicle body.

The latch 91 latches to the striker 92 when the rear door 17 has been closed over the rear vehicle body opening 24, whereby the load F2 transferred to the rear door beam 87 can be transferred to the rear part 24b of the rear vehicle body opening 24 via the latch 91 and the striker 92.

The rear part 24b of the rear vehicle body opening 24 is formed on the rear pillar 25. Consequently, the load F2 transferred to the rear part 24b of the rear vehicle body opening 24 can be suitably supported by the rear pillar 25.

Figure 15:
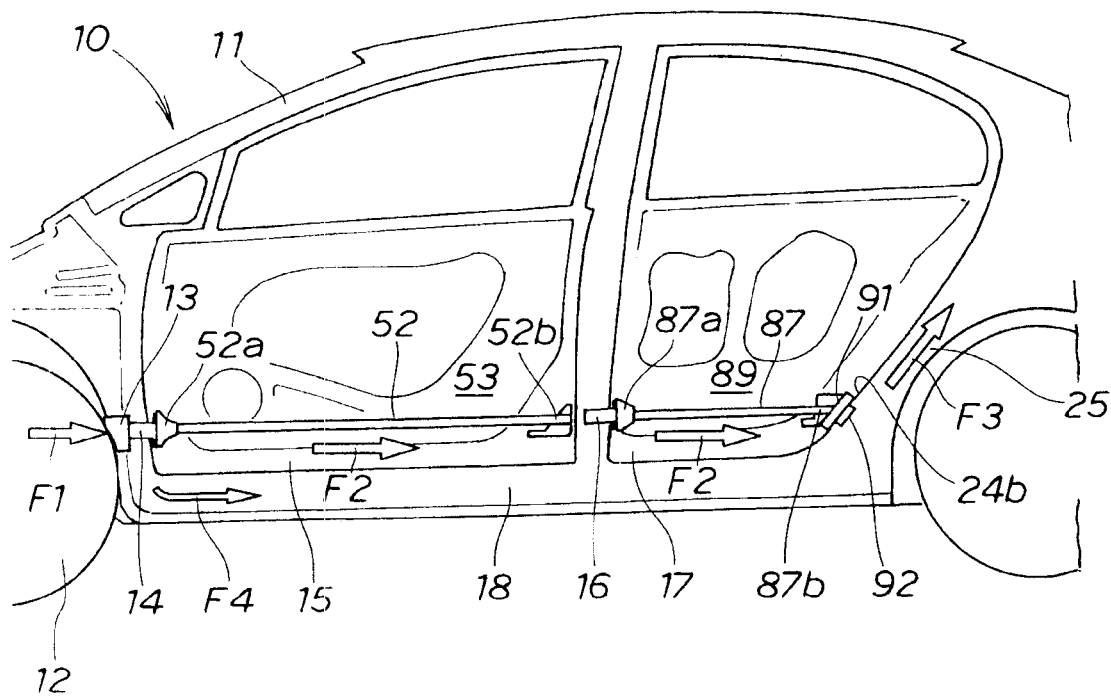
FIG. 15 is a schematic side view showing a load being transferred from the front part of the vehicle body side structure through to the rear part.

Next, the load transmission described in FIGS. 12 through 14 will be summarized in FIG. 15.

A load F1 acts on the interaction 13 from the front wheel 12, whereby the interaction 13 collapses (deforms) and some of the load F1 is absorbed by the interaction 13, as shown in FIG. 15. The rest of the load F2 from the load F1 is transmitted to the front end 52a of the front door beam 52 via the front hinge 14.

The front door beam 52 is provided along the vehicle longitudinal direction on the inside part 53 of the front door 15. Consequently, the load F2 acting from the front hinge 14 can be efficiently transferred to the front door beam 52 (the front door 15). The load F1 acting from the front wheel 12 can thereby be efficiently dispersed to the front door 15, and a load F4 transferred to the side sill 18 can be minimized. It is thereby possible to minimize the rigidity of the side sill 18, and to reduce the weight of the side sill 18.

The load F2 transferred to the front door beam 52 is transferred to the rear door beam 87 (the rear door 17) via the rear hinge 16.

Thus, the load F1 acting from the front wheel 12 is efficiently transferred to the two front and rear doors 15, 17, whereby the load F2 transferred to the rear door beam 87 (the rear door 17) can be transferred to the rear part 24b of the rear vehicle body opening 24 via the latch 91 and the striker 92. Consequently, the load F2 transferred to the rear part 24b of the rear vehicle body opening 24 can be suitably supported by the rear pillar 25. A comparatively large load from the load F1 acting from the front wheel 12 can thereby be transferred to the two front and rear doors 15, 17. Therefore, the load dispersed to the vehicle body 11 (particularly to the side sill 18) can be reduced, and the weight of the vehicle body can be minimized.

The vehicle body side structure 10 according to the present invention is not limited to the previously-described embodiments, and suitable modifications, improvements, and other changes can be made. For example, in the previous embodiment, an example was described in which the latch 91 was provided to the rear door 17 and the striker 92 was provided to the striker 92, but the arrangement is not limited to this option alone, and another possibility is to provide the striker 92 to the rear door 17 and the latch 91 to the rear vehicle body opening 24. Furthermore, another possibility is to provide either one of the latch 91 and the striker 92 to the front door 15, and to provide the other of the latch 91 and the striker 92 to the front vehicle body opening 22.

The shapes of the vehicle body 11, the interaction 13, the front hinge 14, the front door 15, the rear hinge 16, the rear door 17, the front vehicle body opening 22, the rear vehicle body opening 24, the base 31, the extending part 32, the pivot pins 34, the front attachment part 37, the front coupling part 38, the front attachment part body 41, the front bearing 42, the front door beam 52, the inside parts 53 and 89, the rear brackets 56 and 98, the upper inhibiting parts 66 and 106, the lower inhibiting parts 67 and 107, the rear door beam 87, the latch 91, the striker 92, and other components presented in the previous embodiment are not limited to the shapes described, and suitable modifications can be made.

The present invention is suitable for application in a vehicle comprising a vehicle body side structure wherein a door is provided to a front part of a vehicle body opening via a hinge, and a door beam is provided along a vehicle body longitudinal direction to an inside part of the door.

Obviously, various minor changes and modifications of the present invention are possible in light of the above teaching. It is therefore to be understood that within the scope of the appended claims the invention may be practiced otherwise than as specifically described.

What is claimed is:

1. A vehicle body side structure comprising:
a door capable of opening and closing actions via a hinge relative to an opening formed in a vehicle body;
a door beam disposed within the door and extending longitudinally of the vehicle body, the door beam having one end coupled with the hinge; and
a load-transmitting member for transferring a load acted from a front part of the vehicle body toward a rear part of the vehicle body via the hinge,
wherein the hinge includes an attachment part and a coupling part, the attachment part having an attachment part body attached to the vehicle body, and a bearing extending from the attachment part body along a rear part of the load-transmitting member for bearing a load acting on the hinge from the load-transmitting member, the coupling part is rotatably supported on the attachment part and coupled with the door beam, and wherein the rear part of the load-transmitting member has a surface extending in a width direction of the vehicle body, and the bearing of the attachment part has a front end having a surface extending in the width direction of the vehicle body, the surface of the rear part of the load-transmitting member being in contact with the surface of the front end of the bearing.

2. The vehicle body side structure of claim 1, wherein the load-transmitting member is positioned to directly contact and receive a load from a front wheel when a load acts on the front wheel, so as to transfer the load from the front wheel to the bearing.

3. The vehicle body side structure of claim 2, wherein the load-transmitting member includes a base provided on the front part of the hinge, and an extending part continuing from the base and extending farther inwardly in the width direction of the vehicle body than a position of the hinge, the extending part having a collapse load less than a collapse load of the base.

4. A vehicle body side structure comprising:
a door capable of opening and closing actions via a hinge relative to an opening formed in a vehicle body;
a door beam disposed within the door and extending longitudinally of the vehicle body, the door beam having one end coupled with the hinge; and
a load-transmitting member, disposed at a front part of the hinge, for transferring a load acted from a front part of the vehicle body toward a rear part of the vehicle body via the hinge,
wherein the hinge includes an attachment part and a coupling part, the attachment part having an attachment part body attached to the vehicle body, and a bearing extending from the attachment part body along a rear part of the load-transmitting member for bearing a load acting on the hinge from the load-transmitting member, and the coupling part is rotatably supported on the attachment part and coupled with the door beam,
wherein the load-transmitting member is positioned between the hinge and a front wheel, and is configured to transfer a load acting on the front wheel from the front wheel to the bearing,
wherein the bearing protrudes from a front end of the attachment part body in a vehicle-body-width direction, and the load-transmitting member is pivotally secured via a pivot shaft to a vehicle-body-width-direction outer end of the bearing.

5. The vehicle body side structure of claim 1, further comprising a rear door longitudinally aligned in a rearward direction from the door along the vehicle body, the rear door capable of opening and closing actions via a rear hinge relative to an opening formed in a rear part of the vehicle body, and a rear door beam is disposed within the rear door and extends longitudinally of the vehicle body, the rear door beam having an end coupled with the rear hinge, the rear hinge and rear door beam positioned so that the door beam within the door transfers a load acted thereon to the rear hinge, and the load acted on the rear hinge from the door beam within the door is transferred to the rear door beam via the end of the rear door beam and the door beam within the door functions as a load-transmitting member for transferring the load to the rear door beam.

6. The vehicle body side structure of claim 1, wherein the door beam has an opposite end coupled with a rear part of the door via a bracket having parts for inhibiting vertical movements of the door beam.

7. The vehicle body side structure of claim 1, further comprising a latch and a striker, wherein one of the latch and the striker is provided at a vicinity of an opposite end of the door beam within the door, and the other of the latch and the striker is provided to a rear part of the vehicle body opening, the latch being capable of latching onto the striker for holding the door closed over the vehicle body opening.

8. The vehicle body side structure of claim 1, wherein the load-transmitting member, the hinge, and the door beam are aligned in the longitudinal direction of the vehicle so as to be disposed at a substantially uniform vertical position.

9. The vehicle body side structure of claim 1, wherein the hinge and the load-transmitting member are connected to the front pillar of the vehicle body.

10. The vehicle body side structure of claim 9, wherein the hinge attachment part body is directly attached to the front pillar of the vehicle body.

11. The vehicle body side structure of claim 5, wherein the load-transmitting member, the hinge, the door beam, the rear hinge, and the rear door beam are aligned in a longitudinal direction of the vehicle so as to be disposed at a substantially uniform vertical position.

12. The vehicle body side structure of claim 2, wherein the load-transmitting member is directly connected to a front part of the hinge and positioned between the hinge and the front wheel, at least a portion of the load-transmitting member being disposed in a forward direction relative to a forward surface of the front pillar such that said portion of the load-transmitting member is disposed between the front pillar and the front wheel.

* * * * *